United States Patent [19]

Hill

[11] 4,294,809

[45] Oct. 13, 1981

[54] AERATION OF PHOSPHORIC ACID

[75] Inventor: Richard N. Hill, Lakeland, Fla.

[73] Assignee: W. R. Grace & Co., New York, N.Y.

[21] Appl. No.: 191,940

[22] Filed: Sep. 29, 1980

Related U.S. Application Data

[60] Continuation-in-part of Ser. No. 54,449, Jul. 3, 1979, which is a continuation-in-part of Ser. No. 951,804, Oct. 16, 1978, abandoned, which is a continuation of Ser. No. 767,175, Feb. 9, 1977, abandoned, which is a division of Ser. No. 683,756, May 6, 1976, abandoned, said Ser. No. 54,449, is a continuation-in-part of Ser. No. 883,381, Mar. 6, 1978, Pat. No. 4,164,550, said Ser. No. 883,381, and Ser. No. 951,804, each is a continuation-in-part of Ser. No. 812,319, Jul. 1, 1977, Pat. No. 4,110,422, which is a continuation-in-part of Ser. No. 683,756.

[51] Int. Cl.$^3$ .............................................. C01B 25/16
[52] U.S. Cl. ................................................ 423/321 R
[58] Field of Search ..................................... 423/321 R

[56] References Cited

U.S. PATENT DOCUMENTS

| | | | |
|---|---|---|---|
| 3,845,198 | 10/1974 | Marcot | 423/633 |
| 3,907,680 | 9/1975 | Hill, Sr. | 423/321 R |
| 4,044,108 | 8/1977 | Kikuchi et al. | 423/321 R |
| 4,048,289 | 9/1977 | Pierres | 423/317 |
| 4,110,422 | 8/1978 | Hill | 423/321 R |
| 4,164,550 | 8/1979 | Hill | 423/321 R |
| 4,209,497 | 6/1980 | Irani et al. | 423/321 R |

*Primary Examiner*—Earl C. Thomas
*Assistant Examiner*—Wayne A. Langel
*Attorney, Agent, or Firm*—Charles L. Harness

[57] ABSTRACT

Aeration of Hill phosphoric acid, preferably with perlite, and preferably with a chemical oxidant, e.g., $H_2O_2$. Gives good post-precipitation control with high-iron phosphate rock, even in winter conditions.

4 Claims, No Drawings

AERATION OF PHOSPHORIC ACID

This is a continuation-in-part of my copending application, Ser. No. 54,449, filed July 3, 1979, which is a continuation-in-part of my application Ser. No. 951,804, filed Oct. 16, 1978, now abandoned, which is a continuation of my Ser. No. 767, 175, filed Feb. 9, 1977, now abandoned, which is a division of my Ser. No. 683,756 filed May 6, 1976, now abandoned. Ser. No. 951,804 is also a continuation-in-part of my application Ser. No. 812,319, filed July 1, 1977, now U.S. Pat. No. 4,110,422, which is a continuation-in-part of said Ser. No. 683,756. Ser. No. 54,449 is also a continuation-in-part of my application Ser. No. 883,381, filed Mar. 6, 1978, now U.S. Pat. No. 4,164,550, which is a continuation-in-part of Ser. No. 812,319, aforesaid. A related case is my Ser. No. 54,446, filed July 3, 1979, "Improved Production of Stabilized Wet Process Phosphoric Acid." The aforesaid Ser. Nos. 951,804, 54,449, and 54,446; and U.S. Pat. Nos. 4,110,422 and 4,164,550 are each herein incorporated by reference in their entireties.

The instant invention is directed to an improvement in the Hill phosphoric acid process. It involves aeration and is particularly useful in treatment of high-iron feeds (rock and dilute acid) in which some of the iron is present in ferrous form. In accordance with a portion of the invention, $Fe^{++}$ in the dilute acid (26–36% $P_2O_5$) is oxidized to $Fe^{+++}$, in the presence of perlite or equivalent aluminum silicate, and suitably with added chemical oxidant. This oxidation procedure results in less post-precipitation of the final product acid (56%–60% $P_2O_5$).

Oxidation treatment of phosphoric acid is well known in the art, and has been recommended for various purposes, including post-precipitation control. For example, U.S. Pat. No. 4,048,289 teaches oxidation of phosphoric acid. However, the process requires addition of active silica, e.g., diatomaceous earth.

The basic Hill phosphoric acid process, in one aspect, has been modified to use oxidation. See my copending application Ser. No. 110,805, filed Jan. 10, 1980, "Seed Return," herein incorporated in its entirety by reference.

While I do not wish to be bound to any theory, it appears that the oxidation involves substantially only divalent iron ions. $Fe^{++}$ is converted, at least partially, to $Fe^{+++}$, which forms phosphate complexes that do not drop out in the storage tank or during shipment.

The instant invention is thus directed to a novel system of accomplishing the requisite $Fe^{++}$ oxidation.

The Hill process for control of post precipitation in phosphoric acid is well known. It is the subject of U.S. Pat. Nos. 4,110,422 and 4,164,550, and at this writing it is in commercial use in facilities operated by W. R. Grace & Co. in Bartow, Fla.

In summary the Hill process starts with crude phosphoric acid, suitably 26–36% $P_2O_5$, e.g., the No. 1 filtrate, 28% $P_2O_5$. This material is thoroughly clarified with conventional flocculants. Then perlite or other suitable aluminum silicate is added, suitably in an amount of 8–16 pounds per ton of contained $P_2O_5$. The perlite-acid mix is then concentrated in conventional evaporators to about 50% $P_2O_5$ acid and this material is sent to a crystallizer where solids drop out of the acid. The underflow from the crystallizer is returned to the train, suitably to the clarifier. The overflow is generally concentrated further, e.g., up to 56–63% $P_2O_5$, and typically 60% $P_2O_5$. Under the preferred conditions of operation the product leaving the final evaporator is very low in solids and further precipitation is negligible, even during storage for some weeks thereafter and shipment of many hundreds of miles.

On the other hand, despite the general overall satisfactory character of the Hill process, it is susceptible to occasional variation, stemming generally from variations in phosphate rock analyses. Also, while post-precipitation under preferred conditions is generally quite small, there is frequently some post-precipitation. It is an object of this invention to further reduce post-precipitation under certain adverse conditions.

Although the invention is useful as an improvement in the general Hill process using typical Florida phosphate rock and feed acid (i.e., whether low, average, or high-iron), it is particularly useful in cases where the weight ratio of total Fe (as $Fe_2O_3$) to $P_2O_5$ in the feed acid is 0.04 or higher, e.g., to 0.065. In aggravated cases, all or nearly all the Fe can be present as $Fe^{++}$.

As practitioners in the art will note, such high Fe is rarely encountered in actual commercial practice. (A few phosphate rocks in Central Florida may from time to time produce acids with an Fe content as high as used here.) High Fe was synthetically provided in several of these examples by the addition of iron filings, which simultaneously reduced $Fe^{+++}$ to $Fe^{++}$.

AERATION APPARATUS

In all the following examples the aeration vessel consisted of a 2000 ml glass beaker fitted with a baffle next to the beaker wall. The stirrer shaft was deliberately placed slightly off center (about ¾ inches from center) and was equipped with a propeller and a paddle mixer. The shaft was run at 1200–1600 rpm. This gave excellent aeration in the sample and effectively dispersed air throughout the acid sample so as to increase the apparent acid volume by about 25%. The beaker was equipped with a thermometer.

EXAMPLE 1

In this series of experiments the aeration apparatus used was that described in Example 1. The samples were aerated at 65°–75° C. The head sample assayed

|  | Wt. % |
|---|---|
| $P_2O_5$ | 29.10 |
| $Fe^{++}$ | 0.96 |
| Total Fe | 1.31 |

Two series of runs were made in the aerator, one series with 1% perlite (based on $P_2O_5$), the other with no perlite. The samples were examined every 10 minutes as to $P_2O_5$, $Fe^{++}$, and total Fe. Results are given in the following table. Values are in weight %.

TABLE 1

Aeration With and Without Perlite

| Aeration Time | Perlite 1% of $P_2O_5$ | | | No Perlite | | |
|---|---|---|---|---|---|---|
|  | $P_2O_5$ | $Fe^{++}$ | Total Fe | $P_2O_5$ | $Fe^{++}$ | Total Fe |
| 10 minutes | 28.4 | 0.86 | 1.29 | 29.2 | 0.88 | 1.31 |
| 20 minutes | 29.0 | 0.82 | 1.33 | 29.4 | 0.84 | 1.31 |
| 30 minutes | 29.1 | 0.81 | 1.33 | 29.5 | 0.83 | 1.31 |
| 40 minutes | 29.4 | 0.77 | 1.32 | 29.6 | 0.82 | 1.32 |
| 50 minutes | 29.4 | 0.69 | 1.32 | 29.6 | 0.76 | 1.33 |

TABLE 1-continued

| | Aeration With and Without Perlite | | | | | |
|---|---|---|---|---|---|---|
| | Perlite 1% of $P_2O_5$ | | | No Perlite | | |
| Aeration Time | $P_2O_5$ | $Fe^{++}$ | Total Fe | $P_2O_5$ | $Fe^{++}$ | Total Fe |
| 60 minutes | 29.4 | 0.69 | 1.32 | 29.8 | 0.66 | 1.33 |

The data indicate that perlite assists oxidation in the initial stages of the aeration, but that simple aeration eventually tends to catch up with perlite assisted aeration.

EXAMPLE 2

The 60-minute product with perlite from the preceding example was evaporated to 49.40% $P_2O_5$, at which point it assayed:

| | Wt. % |
|---|---|
| $P_2O_5$ | 49.40 |
| $Fe^{++}$ | 1.26 |
| Total Fe | 2.21 |
| $H_2SO_4$ | 5.30 |

It was settled (about one hour required), then evaporated to 57.10% $P_2O_5$, at which point it assayed:

| | Wt. % |
|---|---|
| $P_2O_5$ | 57.10 |
| $Fe^{++}$ | 1.41 |
| Fe | 2.64 |

It was set aside for 26 days at 35° F. in a refrigerator and examined for post precipitation from time to time. There was negligible precipitation. After removal from the refrigerator it was allowed to stand for another three days at room temperature. There was negligible post precipitation.

The evaporation apparatus used in this and subsequent examples was a so-called Rinco rotating evaporator made by Servo-Instruments Corp. of Spring Valley, Ill. The unit consists of a 2-liter round bottom flask, placed at an angle (e.g., 30° to the horizontal), and motor-rotated. The flask neck is equipped with rotational bearings and vapor seals, and leads to a liquid trap, vacuum pump and a condenser. Flask rotation results in maintaining a thin film of phosphoric acid in the upper areas of the flask, thereby facilitating evaporation. To the flask may be added typically 700 to 1,000 cc. of acid. The flask was partially immersed in a pan of hot water as a heat source.

The type of evaporator is not crucial. If desired, the acid may simply be boiled in an open pan. This takes longer, and there may be foaming and other problems.

EXAMPLE 3

The 60-minute aeration product of Example 1 without perlite was evaporated to give the following assay:

| | Wt. % |
|---|---|
| $P_2O_5$ | 49.40 |
| $Fe^{++}$ | 1.21 |
| Total Fe | 2.19 |

| | Wt. % |
|---|---|
| $H_2SO_4$ | 5.50 |

It was settled, decanted, and evaporated again to:

| | Wt. % |
|---|---|
| $P_2O_5$ | 57.10 |
| $Fe^{++}$ | 1.37 |
| Total Fe | 2.59 |

This sample was set aside at 35° F. It set up (post precipitated) within 26 days. The exact day of set-up was not identified. A second identical sample held for a month at room temperature showed negligible post precipitation.

EXAMPLE 4

The head sample assayed

| | Wt. % |
|---|---|
| $P_2O_5$ | 29.10 |
| $Fe^{++}$ | 0.96 |
| Total Fe | 1.31 |

To 361 g. of this acid was added 3.6 g. perlite (1% based on the $P_2O_5$). The sample was then heated to 70° C. and stirred at 1600 RPM for 10 minutes in the apparatus of Example 5. This resulted in thorough aeration. Next, it was evaporated to 49% $P_2O_5$, settled for two hours, decanted, and evaporated again, to:

| | Wt. % |
|---|---|
| $P_2O_5$ | 55.90 |
| $Fe^{++}$ | 1.56 |
| Total Fe | 2.55 |
| $H_2SO_4$ | 6.30 |

The sample was set aside at 35° F. After 25 days it had not post-precipitated. It was removed from refrigeration and allowed to stand at room temperature for another two days, but there was no post precipitation.

A comparison of Example 3 (aeration with no perlite present) and Examples 2 and 4 (aeration with perlite present) indicates that aeration alone will control post precipitation for storage and/or shipment of high iron Hill acid at room temperature, but that perlite should be present for storage and/or shipment in cold weather.

It is important that the settling step be sufficiently prolonged to clear the acid of crystals, fines, sludge, and sediment. (This step is equivalent to the crystallizer-settler operation in the basic Hill process.) In a run similar to that of Example 4, settling the first evaporated product (48.50% $P_2O_5$) for only one hour proved inadequate, as the product of the next evaporation (to 58.20% $P_2O_5$) set up in the refrigerator (35° F.) in 24 days. The process steps were otherwise substantially the same.

EXAMPLE 5

The starting acid was 600 cc. (711.5 g.) of acid assaying:

|   | Wt. % |
|---|---|
| $P_2O_5$ | 28.60 |
| $H_2SO_4$ | 3.0 |
| $Fe^{++}$ | 1.17 |
| Total Fe | 1.29 |
| F | 1.83 |

This was placed in the aeration apparatus above described. To this acid was added 2 g. perlite, 1 g. $Na_2O_2$, and 3 drops of defoamer. The $Na_2O_2$ was about 17.3% stoichiometric on $Fe^{++}$ based on the following equation:

$$\frac{112}{2Fe^{++}} + \frac{78}{Na_2O_2} + \frac{2}{2H^+} = \frac{112}{2Fe^{+++}} + \frac{62}{Na_2O} + \frac{18}{H_2O}$$

The 17.3% was calculated as follows. $Fe^{++}$ was $0.0117 \times 711.5$ g. $= 8.3$ g.$Fe^{++}$. Stoichiometric $Na_2O_2$ would be $8.3(78/112) = 5.78$ g. The 1 g. $Na_2O_2$ was therefore $1/5.78 = 17.3\%$ of stoichiometric.

The acid was stirred rapidly for about 45 minutes, with copious amounts of air being sucked around the paddle. Following this operation, the result was evaporated to 48.50% $P_2O_5$ (with 1.78% $Fe^{++}$, 2.30% total Fe), then settled, decanted, and evaporated again to 56.6% $P_2O_5$, 2.02% $Fe^{++}$, and 2.52% total Fe. Seven weeks later the acid still showed no post precipitation. $Fe^{++}$ was oxidized by about 13%, i.e., $2.02 \times 28.6/56.6 = 1.02$; $(1.17 - 1.02)/1.17 = 0.128$.

Note that feed acid is considered "high iron" if the total Fe (as $Fe_2O_3$):$P_2O_5$ ratio is 0.04 or higher. Here, for example, total Fe in the starting acid was 1.29%. This converts to $1.29 \div 0.7 = 1.84\%$ $Fe_2O_3$. Thus $Fe_2O_3$:$P_2O_5$ was $1.84/28.6 = 0.064$, which is a high iron acid.

This Example 5 invites certain observations. First, the total Fe in the final product was 2.52%. When this value is converted back to the same basis as Fe in the starting acid, viz., 2.52 (28.6/56.6) = 1.27, as compared to 1.29 at start, we find that substantially no Fe is lost in the process, again indicating negligible Fe compounds settling in the first evaporated product. Secondly, not all the oxidation potential of the $Na_2O_2$ (nor of the aeration, for that matter) was utilized. For example, $Fe^{++}$ at start was 1.17% and at finish (recalculated to same basis) was 2.02 (28.6/56.6) = 1.02%, indicating that $(1.17 - 1.02)/1.17 = 13\%$ of the starting $Fe^{++}$ had been oxidized. This is less than the 17.3% of stoichiometric $Na_2O_2$.

The foregoing indicate that the process works regardless of whether all, or nearly all the $Fe^{++}$ is oxidized; regardless of whether a chemical oxidant is used; and regardless of whether any particular amount of iron compound (or none at all) is precipitated and dropped out as sediment during the process.

EXAMPLE 6

The apparatus and procedure of the preceding example was used.

The feed sample was 1071.4 g. of high iron acid, assay:

|   | Wt. % |
|---|---|
| $P_2O_5$ | 28.60 |
| $H_2SO_4$ | 3.20 |
| $Fe^{++}$ | 1.27 |
| Total Fe | 1.30 |
| F | 1.83 |

$H_2O_2$ was added, 20% of stoichiometric based on the following equation:

$$\frac{2}{2H^+} + \frac{112}{2Fe^{++}} + \frac{34}{H_2O_2} = \frac{112}{2Fe^{+++}} + \frac{36}{2H_2O}$$

Total $Fe^{++}$ in the sample was $1071.4 \times 0.0117$ or 12.54 g. 100% stoichiometric $H_2O_2$ would be $12.54 \times 34/112$ or 3.8 g., so 20% stoichiometric was $0.2 \times 3.8 = 0.76$ g., or 1.52 g. of 50% $H_2O_2$ (1.27 cc), as used.

The sample was poured into the aeration vessel, heated to 70° C., 3.1 g. perlite (1% on the $P_2O_5$) added, and agitation was begun. After half an hour the 1.27 cc $H_2O_2$ was added, and high-speed stirring was continued for another half hour.

After that the acid was transferred to the evaporator and concentrated to 50.4% $P_2O_5$.

The assay at this stage was:

|   | Wt. % |
|---|---|
| $P_2O_5$ | 50.4 |
| Total Fe | 2.26 |
| $Fe^{++}$ | 0.99 |

The 0.99% $Fe^{++}$ adjusted to the starting 28.6% concentration is $0.99 \times 28.6/50.4 = 0.56\%$, and represents an oxidation of $(1.17 - 0.56)/1.17 = 0.52$ or 52%. Since the $H_2O_2$ could provide only 20% oxidation, it is evident that the aeration operation provided the other 32%.

The sample was transferred to a settling vessel overnight. It was decanted, the supernatant evaporated to 57.90% $P_2O_5$, then put in cold storage (35° F.) for one month. There was no post precipitation during this period. The sample was removed and allowed to warm to room temperature. After three days there was still no precipitation.

Final assay:

|   | Wt. % |
|---|---|
| $P_2O_5$ | 57.90 |
| $H_2SO_4$ | 6.3 |
| Total Fe | 2.57 |
| $Fe^{++}$ | 1.13 |
| F | 0.59 |

Final Fe was recalculated back to starting basis, e.g., $2.57 \times 28.6/57.9 = 1.27$, which compares with 1.30% Fe in the starting sample.

EXAMPLE 7

The procedure of Example 6 was used, except that the $H_2O_2$ was only 10% of stoichiometric. The feed stock assayed:

|   | Wt. % |
|---|---|
| $P_2O_5$ | 28.6 |
| $Fe_2O_3$ | 1.86 |
| $Fe^{++}$ | 1.27 |

-continued

| | Wt. % |
|---|---|
| Fe | 1.31 |
| H$_2$SO$_4$ | 3.20 |
| Al$_2$O$_3$ | 0.57 |

The final product (57.9% P$_2$O$_5$) precipitated heavily in one month in cold storage (35° F.) but showed no post precipitation at room temperature during the same period.

Final Assay:

| | Wt. % |
|---|---|
| P$_2$O$_5$ | 57.9 |
| Fe$^{++}$ | 0.89 |
| Total Fe | 2.67 |
| H$_2$SO$_4$ | 6.4 |
| F | 0.57 |

EXAMPLE 8

The above procedures were followed, with exceptions as noted.

The initial sample was 550 cc. (711.5 g) high iron acid analyzing 28.6% P$_2$O$_5$ and 1.27% Fe$^{++}$ (9 g. Fe$^{++}$ in this 550 cc sample). A stoichiometric amount of Na$_2$O$_2$ was added, based on the following equation:

$$\frac{112}{2Fe^{++}} + \frac{78}{Na_2O_2} + \frac{2}{2H^+} = \frac{112}{2Fe^{+++}} + \frac{62}{Na_2O} + \frac{18}{H_2O}$$

Thus was added 9(78/112) or 6.3 g., Na$_2$O$_2$. (A second analysis of the head sample gave Fe$^{++}$ as only 1.17%, or 8.3 g. Fe$^{++}$ in the sample. Hence 6.3 g. Na$_2$O$_2$ was actually in slight stoichiometric excess. Total Fe was 1.29% in the recheck.)

Next 2 g. perlite (1% based on P$_2$O$_5$) was added, and the mix was stirred for 45 minutes with good aeration.

The product was then evaporated to give the following assay:

| | Wt. % |
|---|---|
| P$_2$O$_5$ | 50.00 |
| H$_2$SO$_4$ | 4.70 |
| Fe$^{++}$ | 1.72 |
| Fe | 2.23 |
| F | 0.59 |

The product was allowed to settle, after which the supernatant liquid was decanted, then evaporated to give the following assay:

| | Wt. % |
|---|---|
| P$_2$O$_5$ | 56.6 |
| H$_2$SO$_4$ | 6.3 |
| Fe$^{++}$ | 2.02 |
| Fe | 2.52 |
| F | 0.46 |

The product was set aside at 35° F. for seven weeks, during which time post-precipitation was negligible.

EXAMPLE 9

This followed the same general procedure of the preceding example, with certain exceptions as noted. Commercial No. 1 filtrate from a clarifier was used, 1100 cc. without artificial Fe addition. This sample analyzed:

| | Wt. % |
|---|---|
| P$_2$O$_5$ | 29.00 |
| CaO | 0.27 |
| SiO$_2$ | 0.78 |
| Fe$_2$O$_3$ | 0.96 |
| Al$_2$O$_3$ | 0.86 |
| F | 2.13 |
| H$_2$SO$_4$ | 3.00 |
| MgO | — |
| Solids | — |
| Na$_2$O | 0.14 |
| K$_2$O | 0.10 |
| Total Fe | 0.74 |
| Fe$^{++}$ | 0.11 |

Ratio of Fe$^{++}$/Fe was 0.11/0.74=0.15.
Ratio of total Fe/P$_2$O$_5$ was 0.74/29=0.026.

The acid was stirred for 45 minutes with good aeration. Thereafter it was transferred to the evaporator, two drops of defoamer was added; then it was evaporated to P$_2$O$_5$=51.80%, decanted, then evaporated again, to 62.6% P$_2$O$_5$. Fe$^{++}$ was 0.12, total Fe 1.54. Ratio Fe$^{++}$/Fe was 0.12/1.54=0.078, indicating 33% oxidation of Fe$^{++}$. There was a slight loss of total Fe, probably within experimental error, e.g., 1.54×29/62.5=0.71%, comparing with 0.74% in the starting acid.

The concentrated sample was stored in the refrigerator at 35° C. and showed little or no post precipitation over a period of several weeks.

The above data indicate that:

(1) Fe$^{++}$ in dilute clarified acid (26–36% P$_2$O$_5$) can be at least partially oxidized by simple vigorous agitation; and that this step, coupled into the Hill process, will improve post-precipitation characteristics of high-iron Hill acid at room temperature.

(2) For even better results, especially in cold weather operations, perlite should be present (0.5 to 0.75%, on P$_2$O$_5$) during aeration. If perlite is added in this manner, additional perlite need not be added in the standard Hill process, i.e., between clarification and first evaporation.

(3) A chemical oxidant can be present in stoichiometric or substoichiometric amounts during aeration, and will contribute to aeration and post-precipitation control.

(4) It is not necessary to oxidize all, or even most of Fe$^{++}$ in the feed acid, to accomplish good precipitation control using the invention.

(5) Careful crystallizing-settling of the 46–52% intermediate Hill product is recommended for best results when using this invention.

ANALYTICAL

Except for solids and iron, analyses were made by procedures in "Methods Used and Adopted by the Association of Florida Phosphate Chemists," Fifth Ed., 1970 ("AFPC"). Where more than one method is provided, the selections were as follows:

P, Photometric method (phosphate rock), p. 80.
Aluminum oxide, Atomic absorption method, p. 95.
F, Specific ion electrode method, p. 104A.
Water, Karl Fischer method p. 127.
Phosphoric acid in phosphoric acid, Total phosphoric acid method, p. 132.

Solids were determined by the following procedure:
Apparatus a. Vacuum filtration system
b. Drying oven adjusted to 105° C.
c. Gooch crucible, porcelain, with perforated bottom Reagents:
a. Asbestos—Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3–5 times by adding distilled water and decanting to remove the extremely fine material. The washing is accomplished by thoroughly shaking the blended asbestos with each water wash and then allowing it to settle for 5–10 minutes before decantation of the excess water and fine material.
b. Methanol, absolute.

Determination

Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five-ten grams of sample, accurately weighed, into the crucible. Place the crucible and contents on a filter flask and filter with strong vacuum until all of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

Ferrous and ferric iron were determined by the following procedure:

Reagents
a. Standard Potassium Dichromate
A 0.1 N. solution is made by dissolving 4.904 grams and diluting to one liter with distilled water.
b. Stannous Chloride
Sixty grams of the crystallized salt is dissolved in 600 ml of concentrated HCl and made up to 1 liter with distilled water.
c. Phosphoric Acid—Sulfuric Acid Mixture
150 ml concentrated $H_2SO_4$ and 150 ml concentrated $H_3PO_4$ are diluted to 1 liter with distilled water.
d. Mercuric Chloride
A saturated solution of $HgCl_2$ (60–70 grams per liter) is made.
e. Diphenylamine
One gram of diphenylamine is dissolved in 100 ml of $H_2SO_4$.

Determination

A 5.00 gram sample of acid is weighed into a 250 ml beaker. About 100 ml of distilled water is added to the beaker. Then 15 ml of the phosphoric-sulfuric acid mixture and 4 drops of diphenylamine are added. The solution is stirred and potassium dichromate is added drop by drop until a deep purple color develops. The milliliters of potassium dichromate is recorded and used in the calculation for ferrous iron.

A total iron is run by weighing out 5.00 grams into a 250 ml beaker, adding 25 ml of 1:1 HCl and about one ml of 2% potassium permanganate solution, placing this on the hot plate and boiling until the color of permanganate is destroyed. The iron is then reduced by adding stannous chloride drop by drop until the solution is colorless. Add one-two drops in excess. The solution is allowed to cool to room temperature. The solution is diluted to 100 ml and 15 ml saturated mercuric chloride is added. Add 15 ml of phosphoric-sulfuric acid mixture and 4 drops of diphenylamine indicator. Potassium dichromate is added drop by drop to the stirred solution until a deep purple end point develops.

Calculation:

$$\% \text{ Ferrous Iron} = \frac{\text{ml Titration for Ferrous}}{\text{wt of sample}} \times .005585 \times 100$$

$$\% \text{ Total Iron} = \frac{\text{ml Titration for total}}{\text{wt of sample}} \times .005585 \times 100$$

$$\% \text{ Ferric Iron} = \% \text{ Total Iron} - \% \text{ Ferrous Iron}$$

I claim:
1. In the method of making wet process phosphoric acid analyzing about 56–63% $P_2O_5$ prepared by steps including
 (a) clarifying crude feed acid in a clarifier, said feed acid analyzing about 26–36% $P_2O_5$, and containing $Fe^{++}$ and $Fe^{+++}$, the weight ratio of Fe as $Fe_2O_3:P_2O_5$ being 0.04–0.065:1;
 (b) treating the clarified acid with aluminum silicate;
 (c) concentrating the treated acid to about 46–52% $P_2O_5$;
 (d) settling solids in the concentrated acid in a crystallizer-settler providing an overflow and an underflow;
 (e) further concentrating the overflow in (d) to about 56–63% $P_2O_5$;
the improvement comprising aerating with strong agitation the clarified acid resulting from step (a) to oxidize at least some $Fe^{++}$ to $Fe^{+++}$, whereby post-precipitation characteristics of the acid are improved.

2. Method according to claim 1 in which an oxidant other than air is added during aeration.

3. Method according to claim 2 in which the oxidant is $H_2O_2$, present in a $H_2O_2:Fe^{++}$ weight ratio of about 0.06:1.

4. Method according to claim 1 in which perlite is present during aeration.

* * * * *